US009040143B2

(12) United States Patent
Groft et al.

(10) Patent No.: US 9,040,143 B2
(45) Date of Patent: May 26, 2015

(54) LOW-E HOUSEWRAP

(75) Inventors: Cory L. Groft, Littlestown, PA (US); Thomas W. Dauber, Spring Grove, PA (US)

(73) Assignee: ENVIRONMENTALLY SAFE PRODUCTS, INC., New Oxford, PA (US)

( * ) Notice: Subject to any disclaimer, the term of this patent is extended or adjusted under 35 U.S.C. 154(b) by 0 days.

(21) Appl. No.: 13/107,568

(22) Filed: May 13, 2011

(65) Prior Publication Data

US 2011/0287216 A1 Nov. 24, 2011

Related U.S. Application Data

(60) Provisional application No. 61/346,916, filed on May 21, 2010.

(51) Int. Cl.

| | |
|---|---|
| B32B 3/24 | (2006.01) |
| E04B 1/62 | (2006.01) |
| B32B 3/26 | (2006.01) |
| B32B 5/18 | (2006.01) |
| B32B 13/00 | (2006.01) |
| B32B 15/04 | (2006.01) |
| B32B 15/085 | (2006.01) |
| B32B 15/14 | (2006.01) |
| B32B 15/20 | (2006.01) |
| B32B 27/12 | (2006.01) |
| E04B 1/76 | (2006.01) |

(52) U.S. Cl.
CPC ............... *E04B 1/625* (2013.01); *B32B 3/266* (2013.01); *B32B 5/18* (2013.01); *B32B 13/00* (2013.01); *B32B 15/046* (2013.01); *B32B 15/085* (2013.01); *B32B 15/14* (2013.01); *B32B 15/20* (2013.01); *B32B 27/12* (2013.01); *B32B 2266/025* (2013.01); *B32B 2266/08* (2013.01); *B32B 2307/304* (2013.01); *B32B 2307/416* (2013.01); *B32B 2307/54* (2013.01); *B32B 2307/7246* (2013.01); *B32B 2405/00* (2013.01); *B32B 2419/00* (2013.01); *B32B 2607/00* (2013.01); *E04B 2001/7691* (2013.01)

(58) Field of Classification Search
USPC .......................................................... 428/137
See application file for complete search history.

(56) References Cited

U.S. PATENT DOCUMENTS

| | | | |
|---|---|---|---|
| 4,726,985 A | 2/1988 | Fay et al. | |
| 5,316,835 A * | 5/1994 | Groft et al. | ..................... 442/30 |
| 6,128,879 A | 10/2000 | Bussey, Jr. et al. | |

FOREIGN PATENT DOCUMENTS

| | | |
|---|---|---|
| CN | 2010 31473 Y | 3/2008 |
| WO | WO 2008/002934 A3 | 1/2008 |

OTHER PUBLICATIONS

International Search Report for PCT/US2011/036497 dated Oct. 26, 2011.
Written Opinion of the International Searching Authority for PCT/US2011/036497 dated Oct. 26, 2011.

* cited by examiner

*Primary Examiner* — William P Watkins, III
(74) *Attorney, Agent, or Firm* — Nixon Peabody LLP

(57) ABSTRACT

A low-E housewrap having improved energy efficiency protection against air infiltration and moisture build-up in buildings. The aforementioned low-E housewrap material utilizing existing framing openings or without increasing the wall profile of a building. The present invention provides a low-E housewrap material which may be implemented on traditional 2×4 framing having R-15 mass insulation material within existing or newly constructed framing cavities. The material of the present invention also meets requirements for serving as a water resistive barrier as defined by ICC AC38.

25 Claims, 12 Drawing Sheets

LOW-E HOUSEWRAP

The present application claims priority to provisional patent application entitled, "LOW-E HOUSEWRAP," filed on May 21, 2010, and assigned U.S. Application Ser. No. 61/346,916.

BACKGROUND OF THE INVENTION

1. Field of the Invention

The present invention relates generally to building structure materials, and more specifically to an infiltration barrier used in building construction to improve energy efficiency and to protect against air infiltration and moisture build-up in buildings.

2. Description of Related Art

In order to improve the energy efficiency of new and existing buildings, it has been common practice in building new structures, and in residing old structures, to cover the exterior wall sheathing with an infiltration barrier, for example, prior to installation of a covering material such as siding. One such infiltration barrier is a high density polyethylene fiber sheeting. While infiltration barriers cut down on drafts and thereby convective heat loss, they provide little other contribution to the energy efficiency of the structure.

In addition to addressing energy efficiencies of new and existing buildings, moisture concerns can be one of the worst enemies of home or building construction. Water or moisture or humid air infiltration if allowed to penetrate behind siding or brick can saturate the wood of a building structure, thereby creating an environment that encourages mildew or rot. A weather resistant barrier has for many years been applied to the wood studs of buildings and homes in order to resist the moisture or water generated by weather. Such material is typically flexible and in a film or sheet form. Typically, this weather resistant barrier or "house wrap" is applied to the wooden stud frame before the application of a final siding or veneer (e.g. brick, metal, painted wood). Many such "wrap" products are commercially available such as, for example: Dupont Tyvek®, Typar®. Housewrap (www.typarhousewrap.com), and Barricade®, building wrap (www.ludlowcp.com).

In 2010 the International Energy Conservation Code (IECC) and International Residential Code (IRC) increased the thermal performance requirements for residential walls. Both of these standards seek to improve thermal performance and reduce energy needs per dwelling. As of January 2010 the U-value requirement for geographical area or zones 5-8 is 0.057; the reciprocal R-value for wall systems is R-20. The U-factor is the inverse, or reciprocal, of the total R-Value, i.e.: U-factor=1/Total R-Value. The R-Value is the thermal resistance to heat flow. A larger R-Value means that the material has greater thermal resistance and more insulating ability as compared to a smaller R-Value. Such R-Values can be added together. For instance, for homogeneous assemblies, the total R-Value of an insulation assembly is the sum of the R-Value of each layer of insulation. These layers may include sheathing and finishes, the insulation itself, air films and weatherproofing elements.

In order to meet the new building requirements, builders have employed additional building techniques such as altering construction of framed openings. For example, typically, builders have constructed walls on 2×4 framing. However, due to the revised requirements, builders are altering building designs by constructing walls on 2×6 framing and inserting, for example, R-20 mass insulation within the respective wall cavity in order to meet the energy/code regulations mandated within the building industry. These techniques, however, increase construction costs because of the added and more expensive construction materials. In addition, the increased size of framing also produces a loss in living space. Nevertheless, many builders have simply accepted the added cost and loss of living space created by the newly implemented thermal code changes.

Accordingly, a need exists for providing a protective wrap that improves energy efficiency and protection against air infiltration and moisture build-up in buildings while satisfying newly implemented industry-wide energy/code regulations. There is also a need for employing a protective wrap which meets or exceeds the newly implemented code requirements on existing framing structures or openings and/or without increasing the wall profile of a building.

SUMMARY OF THE INVENTION

The present invention provides a low-E housewrap material which may be implemented on traditional 2×4 framing having R-15 mass insulation material within existing or newly constructed framing cavities. The material of the present invention also meets requirements for serving as a water resistive barrier as defined by The International Code Council's (ICC) codes and standards used to construct residential and commercial buildings, including homes and schools (e.g., ICC AC38). Thus, by not increasing the wall profile in the attempt to meet new industry standards, the builder does not have to perform additional techniques or provide additional expenses for constructing framed openings.

Still other aspects, features and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A low-E housewrap is described. In the following description, for purposes of explanation, numerous specific details are set forth in order to provide a thorough understanding of the exemplary embodiments. It is apparent to one skilled in the art, however, that the present invention can be practiced without these specific details or with an equivalent arrangement.

Figure 1:
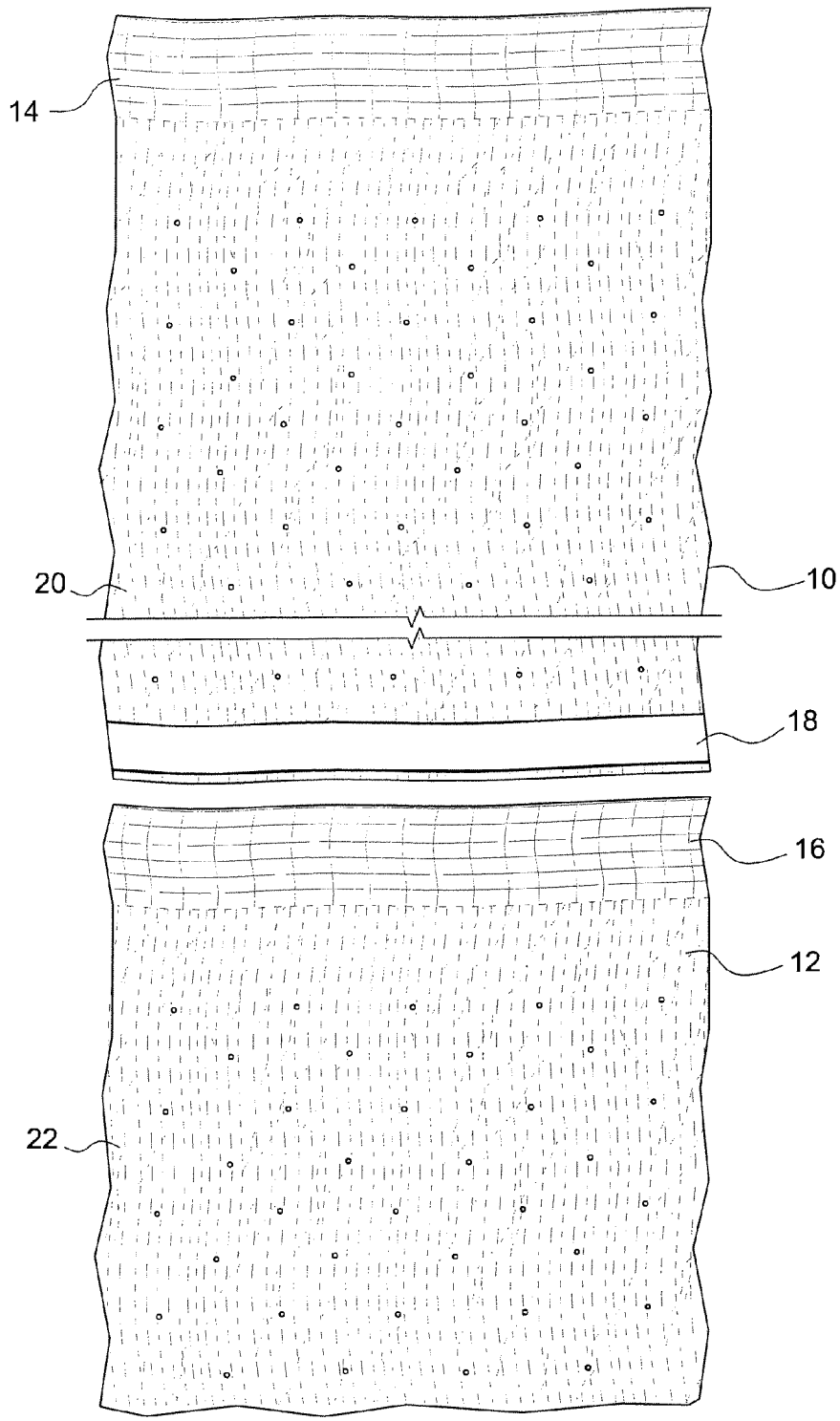
FIG. 1 provides a top view of a low-E housewrap material according to an exemplary disclosed embodiment.

Referring now to the drawings, wherein like reference numerals designate identical or corresponding parts throughout the several views, FIG. 1 illustrates a top view of low-E housewrap materials according to one disclosed embodiment of the present invention. By way of example, two pieces of the low-E housewrap materials 10, 12 are shown. Each of the two pieces of low-E housewrap materials 10, 12 may comprise flap portions 14, 16, respectively, at one end thereof. At another end the low-E housewrap material may include an adhesive strip 18 such as that provided on low-E housewrap material 10. In a preferred embodiment, the top surface 20, 22 of the low-E housewrap materials 10, 12, respectively, is a reflective material such as a layer of reinforced foil material.

Figure 2:
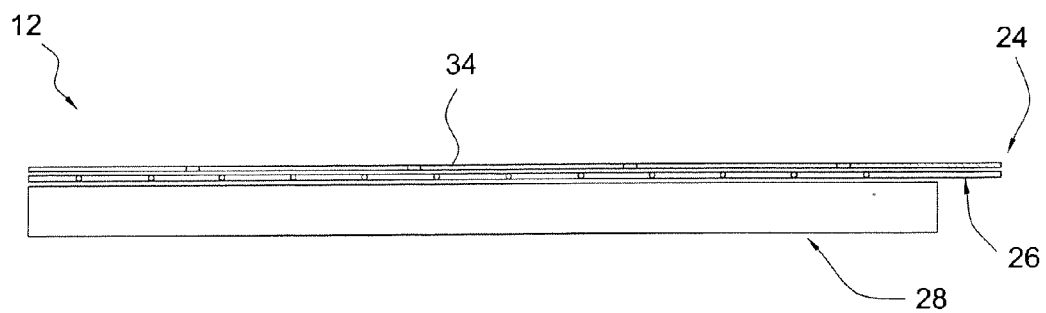
FIG. 2 provides a cross-sectional view of a low-E housewrap material according to an exemplary disclosed embodiment.

Turning to FIG. 2, a cross-section of the low-E housewrap material 12 is shown. The low-E housewrap material 12 may comprise an assembly of product component parts including, for example, a reflective foil material 34, foil reinforcement 26, and a foam material 28. In one embodiment, the reflective material may comprise a facing of approximately 99.4% polished aluminum. It is noted that the reflective material may comprise a facing having any suitable amount of aluminum, for example, greater than about 90%, preferably between about 90% and about 99.9%, even more preferably between about 99.0% and about 99.9%. The reflective foil material 34 may be non reinforced on one side. On the other side, the reflective foil material 34 may comprise a foil reinforcement 26 including, for example, a scrim foil reinforcing 30 (e.g., see FIG. 3). Scrim is a term known in the art to consist of crossed lines of plastics material which serve to strengthen the overall product and to prevent stretching damage to the layers. The reflective foil material 34 and foil reinforcement 26 may be applied over and bonded to the foam material 28. The scrim foil reinforcing 30 is sufficient to provide a tensile strength of approximately 23 pounds per inch width in a machine direction and 25 pounds per inch width in a cross machine direction on a low-E housewrap material test specimen cut approximately 1" wide by 9" long in standard ambient lab conditions. The foam material 28 serves as a polyolefin thermal break such as one comprising a closed cell polyethylene foam. In a preferred embodiment, the nominal thickness of the polyolefin thermal break is approximately ¼" (0.25"). It is noted that the nominal thickness of the polyolefin thermal break may be any suitable thickness, for example, greater than about ⅛" (0.125") and less than about ⅜" (0.375"). Thicknesses above about ¼" are within the scope of the present invention. It is noted that a thickness greater than about ¼" may require use of 2×6 framing instead of the more traditional 2×4 framing. The low-E housewrap 12 may also incorporate a self adhered drainage plane 24 feature as further described below.

Thus, the invention includes a layer of polyethylene foam which serves as a support for the other added component layers. Polyethylene foam or equivalent polypropylene foam may be utilized, both being in the chemical family designated as polyolefins. A thin layer of aluminum foil is bonded indirectly to one or both sides of said foam layer. Thin polyethylene layers are placed between the aluminum foil and the foamed layer. The thin polyethylene is bonded to the aluminum foil layer to greatly improve its resistance to tearing. This strengthening feature means that the end product has a much wider use than has been known in the art. A layer of strengthening scrim may be added to further enhance the product integrity. In practice of the invention, the various layers adjoin one another after being flame or heat roller laminated together.

In certain embodiments and in practice of the invention, both sides of the foam layer may be covered with layers as described above. The end product may thus appear identical on either side with the aluminum foil layers being externally located. Thus, use and installation is simplified since the product may be used with either side facing out since both external faces are identical. The resulting bonded layers are easily rolled, transported and installed without requiring special tools or environmental precautions which must be taken with many other prior art insulations.

Figure 3:
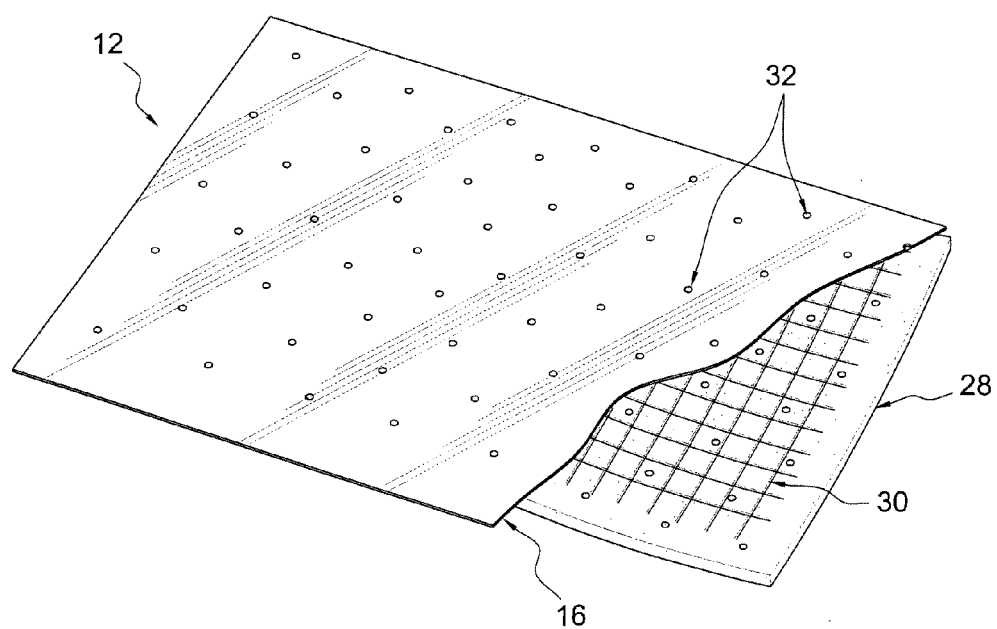
FIG. 3 provides a cut-away perspective view of a low-E housewrap material according to an exemplary disclosed embodiment.

Turning to FIG. 3, the low-E housewrap 12 comprises perforations 32 sufficiently spaced to ensure that the low-E housewrap material does not act as a vapor barrier. In one preferred embodiment, the perforations in the low-E housewrap are generated from perforation system consisting of 1/16" punchers placed in four holes per 1.25 square inch sequence on a collar mechanism. The collar mechanism is mounted to a drive roll assembly for perforation of the low-E housewrap wherein a 1.25 square inch perforation pattern is achieved on the finished product. A perforation pattern of 1.25 square inch allows low-E housewrap 12 to meet the criteria for perms, water vapor transmission and water resistance while maintaining an effective emissivity rating. This is unique and contrary to industry standards wherein in many applications, micro perforations are generated in housewraps using needles for vapor penetration. However, in such convention applications, the micro perforations are susceptible to resealing when exposed to higher temperatures. This affect may trap moisture and induce undesirable results such as mold and rot. In contrast, the present perforation pattern of the prescribed invention eliminates the possibility resealing when exposed to higher temperatures. Spaced in approximately 1.25" square perforations, the low-E housewrap material achieves a preferred permeance and water vapor transmission of approximately 7 perm or 40 g/day/m$^2$. As such, the present low-E housewrap material performs within the optimal permeance and water vapor transmission range of about 5 to about 20 perm.

The present low-E housewrap material meets the Standard Specification for Reflective Insulation, C 1224-03, Section 6, 6.1, which states that "Low emittance materials shall have a surface with an emittance of 0.10 or less, in accordance with test Method C 1371." Specifically, the present low-E housewrap material achieves an emittance of 0.10 or less, more specifically within a range of about 0.03 to about 0.05, in accordance with test Method C 1371.

Accordingly, the product low-E housewrap material of the present invention is constructed to include the following approximate performance characteristics:

| Test Description | Test Results |
| --- | --- |
| Perm Test ASTM E-96 | 7 perms |
| Water Resistance ASTM D-779 | As Received 23 hrs Pass Weathered 23 hrs Pass |
| Ultraviolet light | No Cracking |
| Accelerated Aging | No Cracking |
| Tensile Strength | 23 lbs/inch (machine direction) 25 lbs/inch (cross direction) |
| U-value Wall (zone 5-7) 2010 IECC | .056 vinyl |
| U-value Wall (zone 5-7) 2010 IECC | .051 brick |
| U-value Wall (zone 5-7) 2010 IECC | .063 Stone |

Although the use of 1/16" punchers at a rate of four holes per 1.25 square inch is described above and represents one of many preferred embodiments of the present invention, other size punchers may be used and other rates of holes per given area are within the scope of the present invention. For example, the diameter of the puncher may be varied to any suitable size and the rate may be modified to achieve the particular permeance and emittance standards required by a particular building code, specification or other requirement.

The system U-values described in The Evaluation of Thermal Resistance of a Building Envelope Assembly demonstrates the performance of wood framed walls (2×4 construction 16" on center). The U-value calculations are based on methods outlined by the ASHRAE Handbook of Fundamentals. The U-value performance of these systems achieve a U-value between 0.051 (brick), 0.056 (vinyl) and 0.063 (stone) satisfying or exceeding requirements for zones 1-7 established by 2010 IECC Code Table 402.1.3 or equivalent UA alternative values established by other code bodies.

Figure 4:
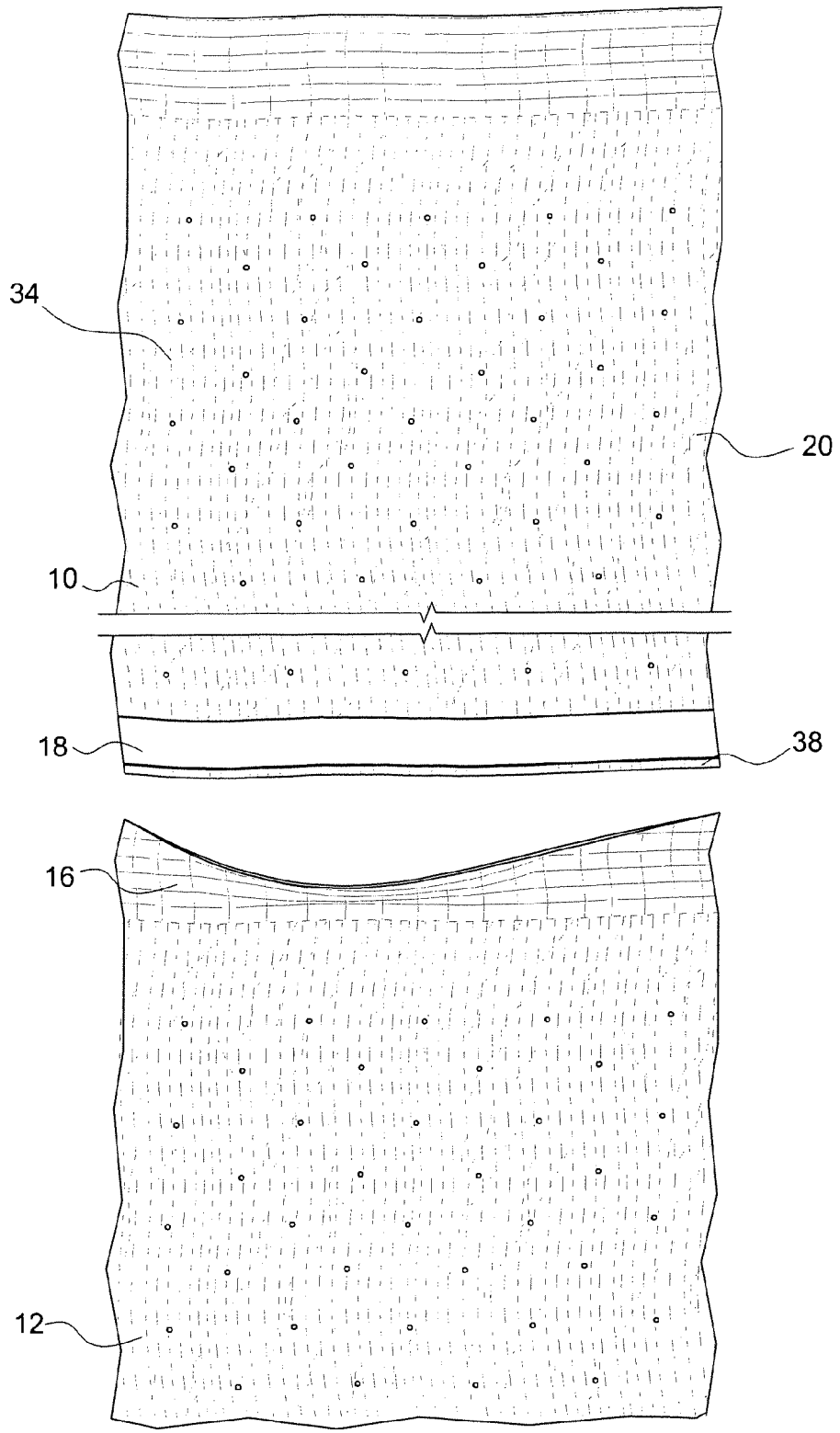
FIG. 4 provides a top view of a low-E housewrap materials during an assembly method according to an exemplary disclosed embodiment.
Figure 5:
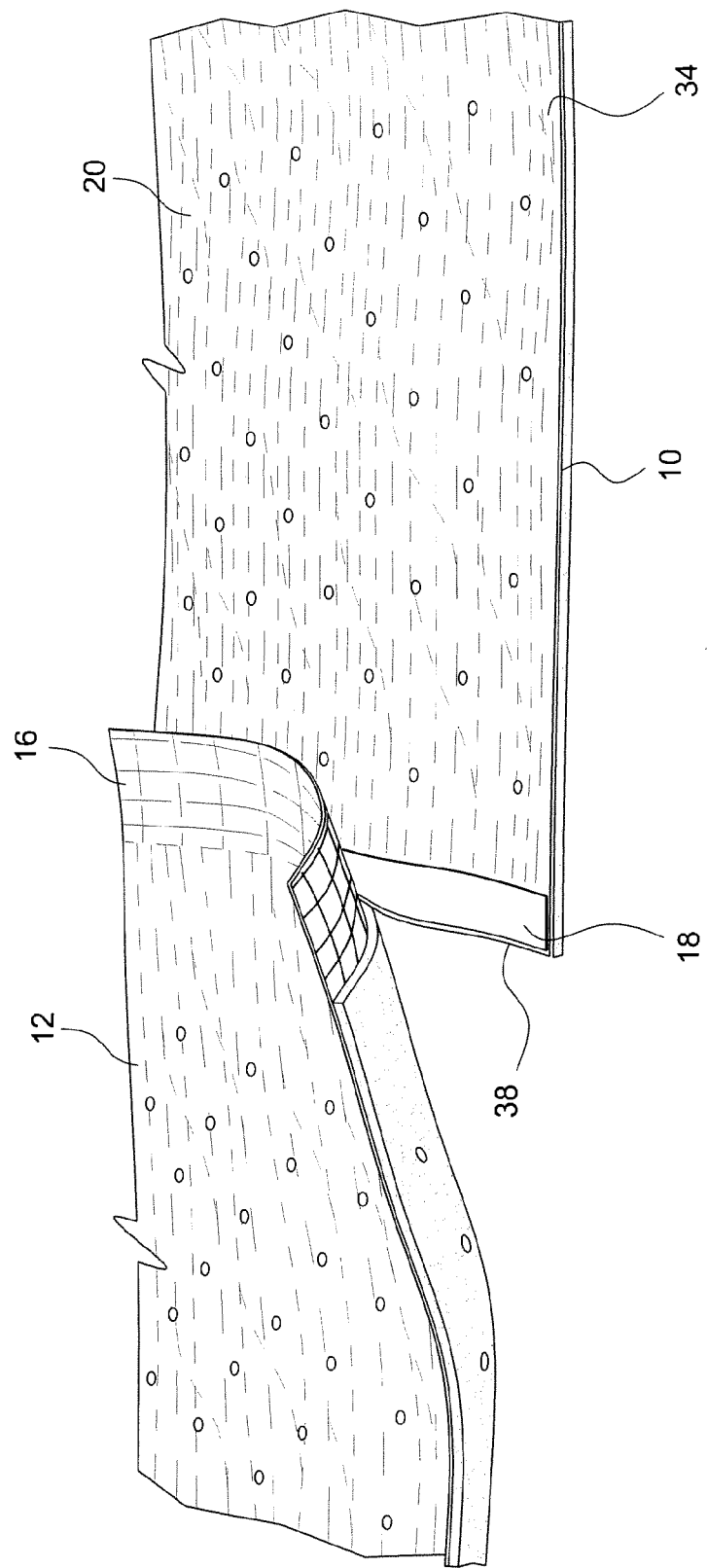
FIG. 5 provides a perspective view of the low-E housewrap materials during the assembly method of FIG. 4.

Flap portion 16 is illustrated in FIG. 3. This overlapping flange serves as a self adhered drainage plane 24. During assembly of one or more low-E housewrap sections, the flap portion 16 may be assembled to cover an edge of an abutting portion of another low-E housewrap material section in order to seal the edge. For example, turning to FIGS. 4 and 5, a first section 10 of low-E housewrap material is positioned near a second section 12 of low-E housewrap material. The flap portion 16 of the second section 12 of low-E housewrap material may be disposed over an edge portion 38 of the first section 10 of low-E housewrap material. In one embodiment, the aforementioned edge portion 38 may include an adhesive strip 18 for retaining the flap portion 16 thereon. The adhesive strip 18 may be employed on the top surface 20 such as on the reflective foil material 34. While the adhesive strip 18 has been described and shown in the drawings for illustrative purposes, any means may be employed which is suitable for retaining the flap portion 14 over the edge portion 38 in order to provide a water resistive barrier between the abutting sections of low-E housewrap materials.

Figure 6:
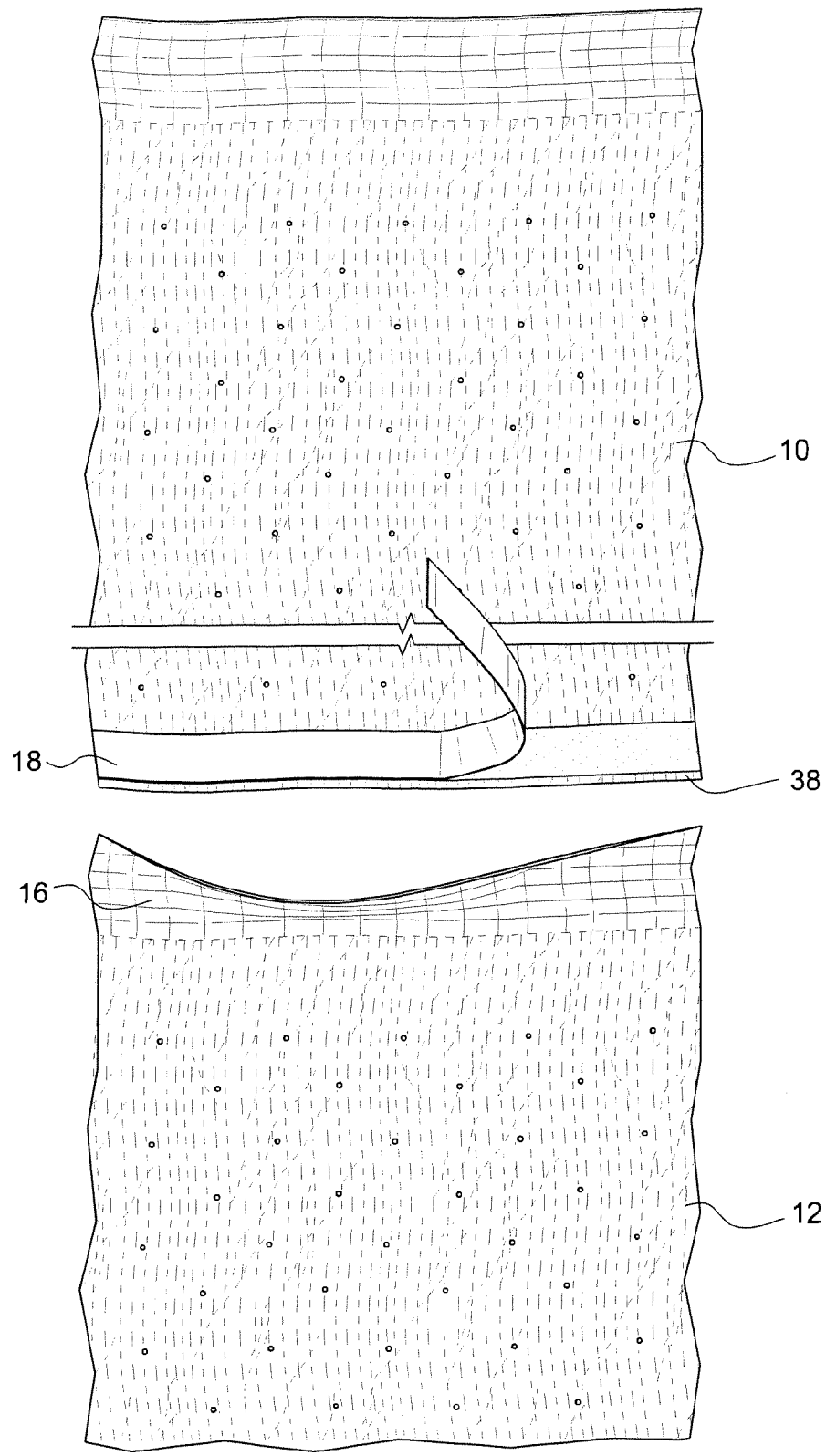
FIG. 6 provides a top view of a low-E housewrap materials during a continued assembly method according to an exemplary disclosed embodiment.
Figure 7:
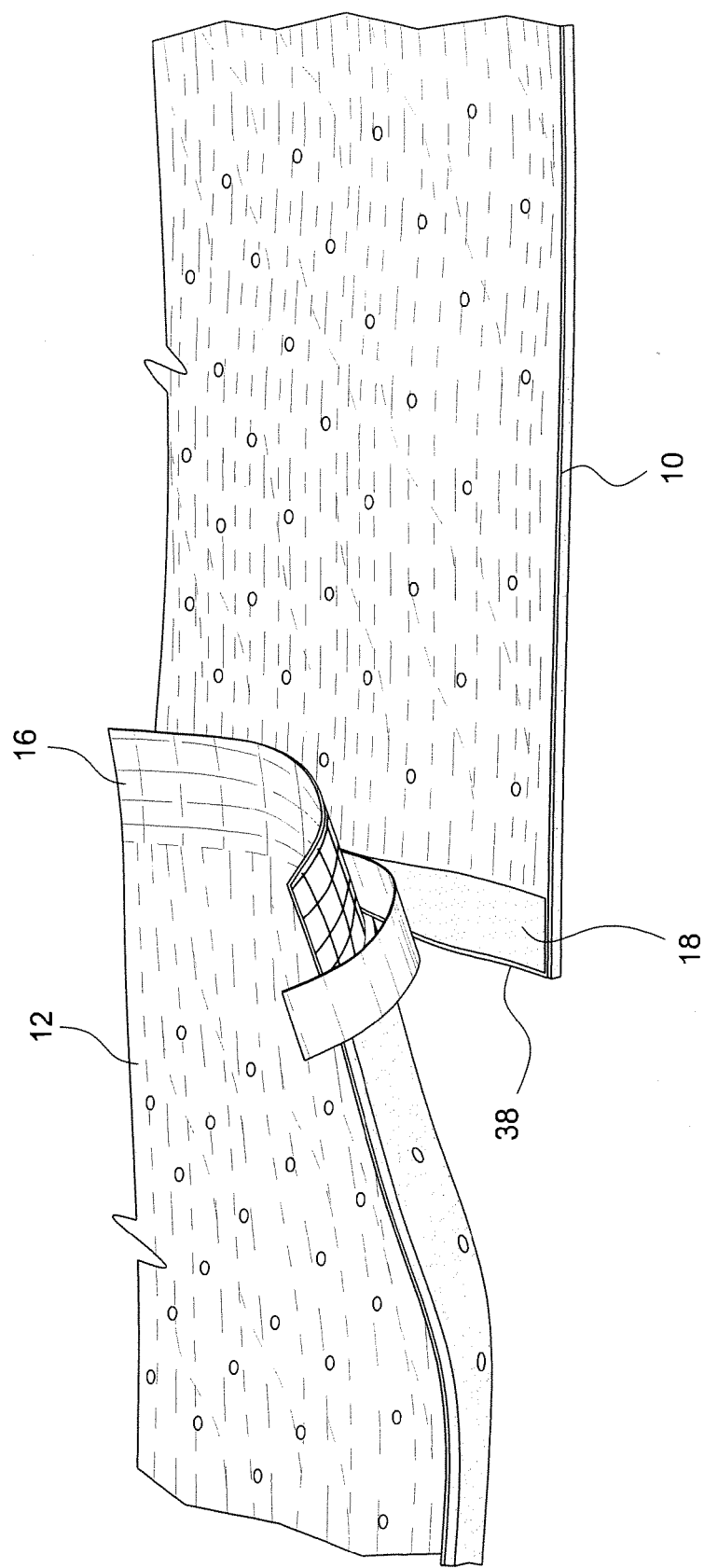
FIG. 7 provides a perspective view of the low-E housewrap materials during the assembly method of FIG. 6.
Figure 8:
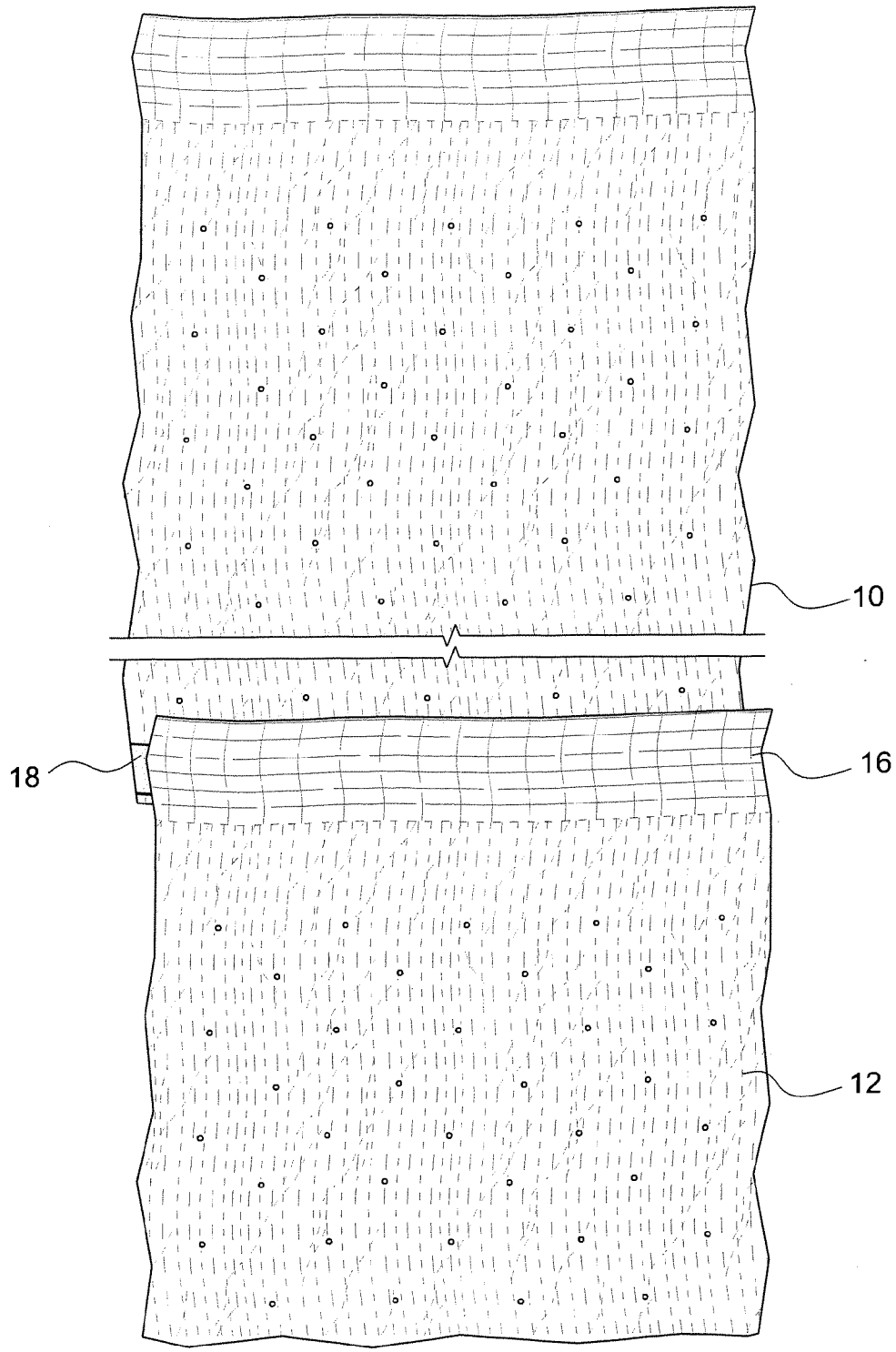
FIG. 8 provides a top view of low-E housewrap materials after assembly according to an exemplary disclosed embodiment.

Turning to FIGS. 6 and 7, a protective film is removed to expose the adhesive strip 18 in preparation for securing the flap portion 16 over the edge portion 38. The flap portion 16 is contacted to the adhesive strip 18 and secured over the edge portion as illustrated in FIG. 8. This assembly serves to provide a water resistive barrier between two abutting sections of low-E housewrap materials of the present invention to effectively seal their respective edges and allow water runoff from one low-E housewrap material section to another low-E housewrap material section.

Figure 9:
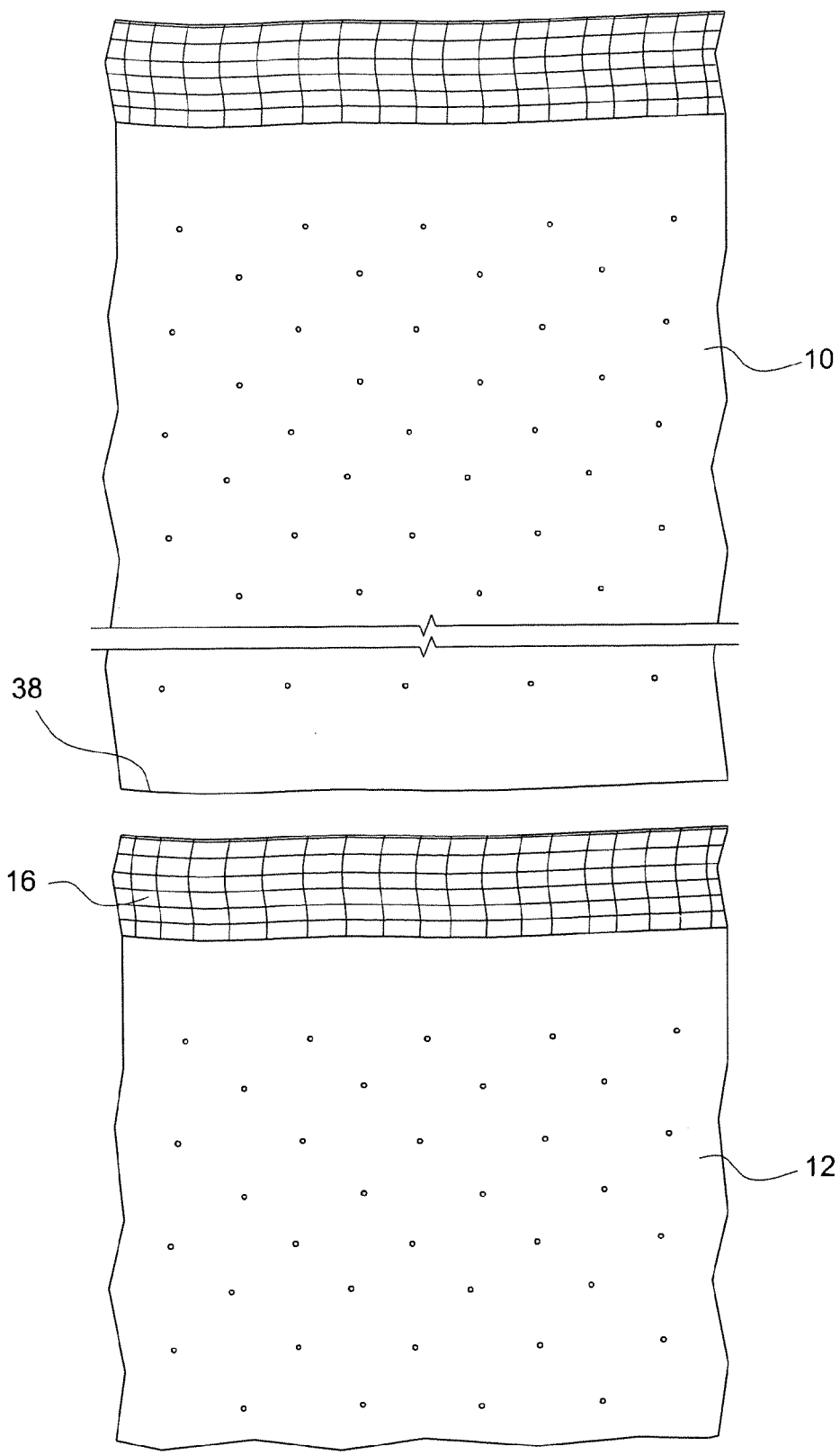
FIG. 9 provides a bottom view of low-E housewrap materials prior to assembly according to an exemplary disclosed embodiment.
Figure 10:
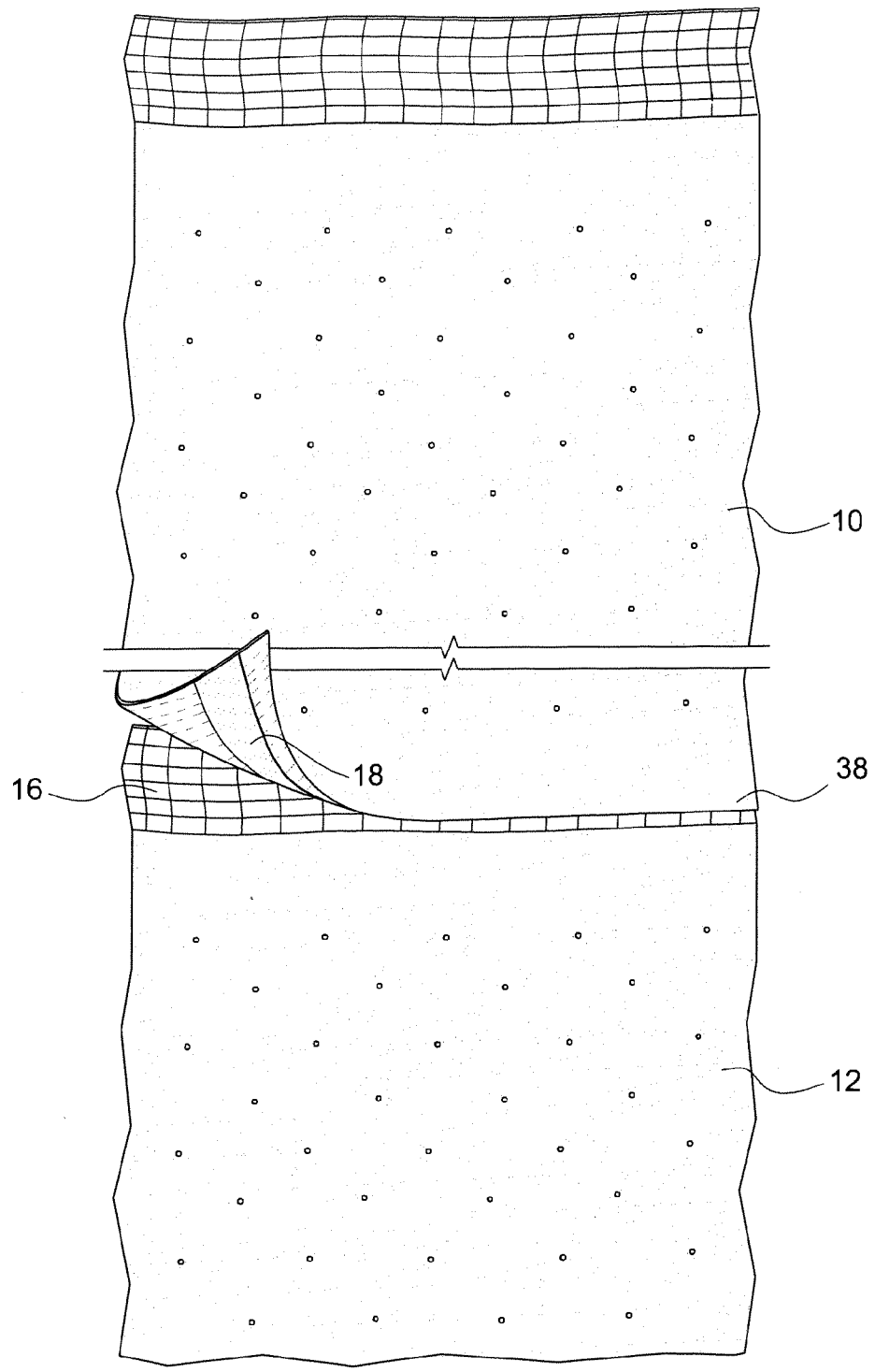
FIG. 10 provides a top view of low-E housewrap materials during an assembly method according to an exemplary disclosed embodiment.
Figure 11:
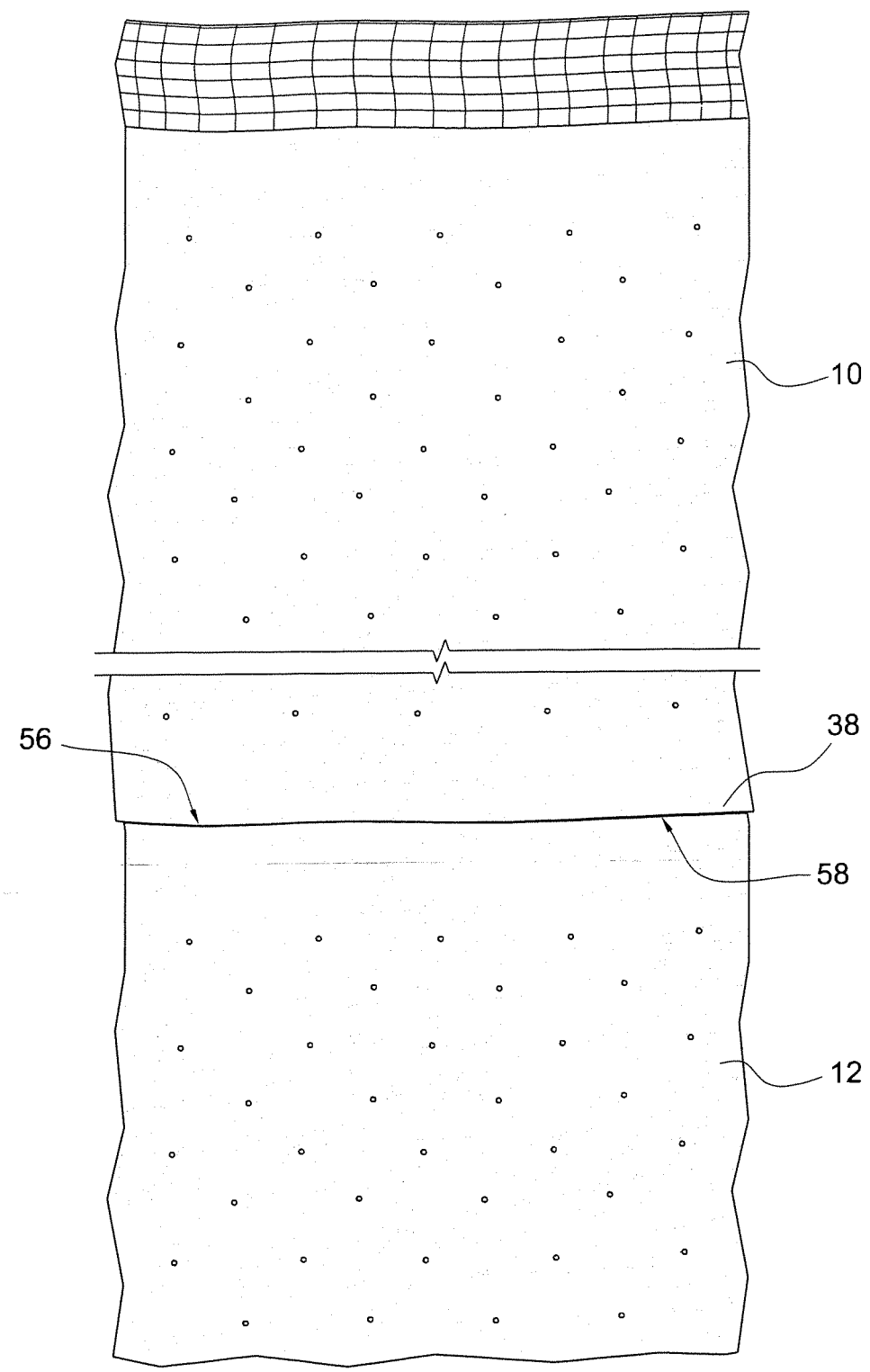
FIG. 11 provides a bottom view of low-E housewrap materials after assembly according to an exemplary disclosed embodiment.

A bottom view vantage point of abutting low-E housewrap materials is illustrated in FIGS. 9-10. Again, the first section 10 of low-E housewrap material is positioned near the second section 12 of low-E housewrap material. The flap portion 16 of the second section 12 of low-E housewrap material is disposed over an edge portion 38 of the first section 10 of low-E housewrap material. Edge portion 38 may include an adhesive strip 18 for retaining the flap portion 16 thereon. As a sufficient force is applied, for example, to flap portion 16 to contact the adhesive strip 18, the flap portion 16 is held in retention over the edge portion 38 as shown, for example, in FIG. 11. It is clear from FIG. 11 that, in a final assembly arrangement, a foam edge portion 56 of a first low-E housewrap material 10 abuts a foam edge portion 58 of a second low-E housewrap 12. Accordingly, the assembled sections serve to provide a water resistive barrier between two abutting sections of low-E housewrap materials of the present invention.

In order to improve the energy efficiency of new and existing building structures, application of the herein described low-E housewrap serves to cover the exterior wall sheathing with an infiltration barrier, for example, prior to installation of a covering material or exterior finish such as siding, brick, stone, masonry, stucco and concrete veneers, for examples. The herein described low-E housewrap also serves to protect against air infiltration and damaging moisture build-up. Air infiltration may occur in typical construction through, among other places, sheathing seams and cracks around windows and doors. Moisture build-up can occur externally in the wall cavity from, for example, leaking exterior finishes or coverings, and cracks around windows and doors. The low-E housewrap of the present invention does not trap the water, but rather allows it to flow downward so as to exit the wall system.

Figure 12:
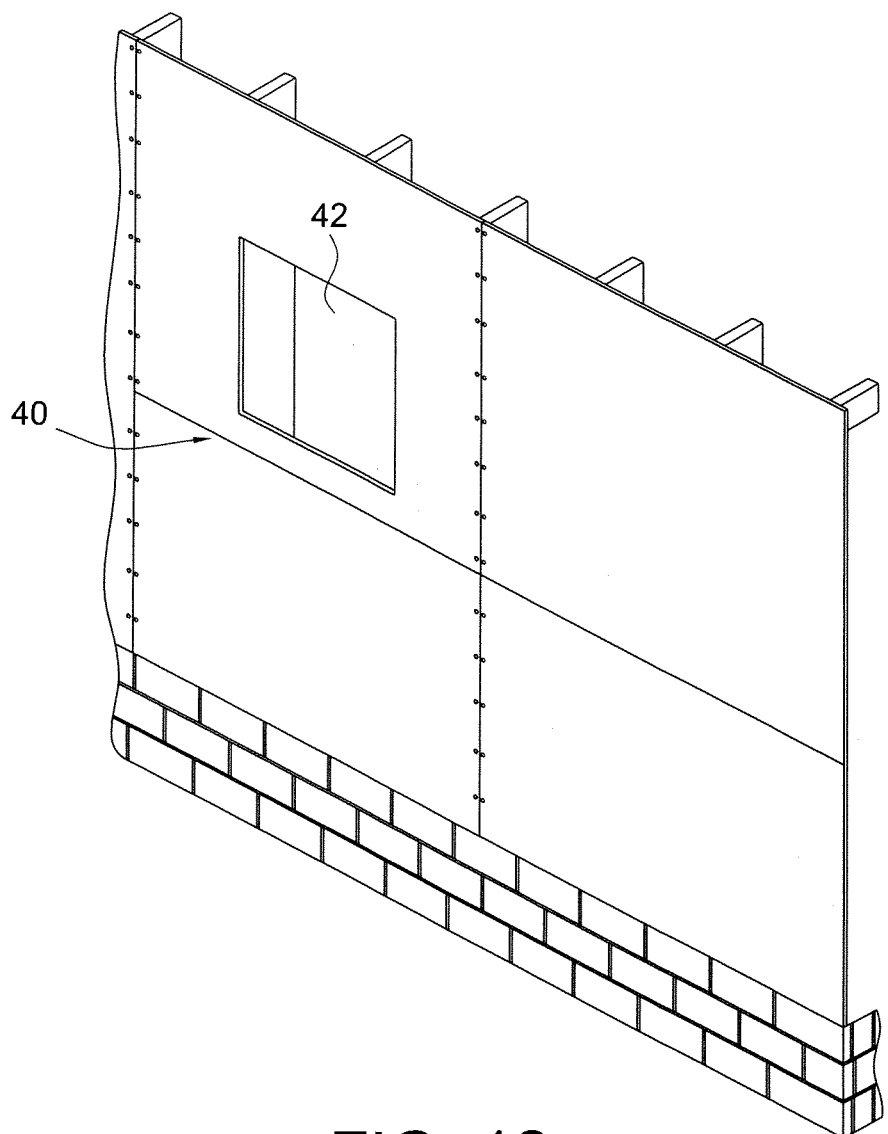
FIG. 12 provides an exemplary exterior wall according to an exemplary disclosed embodiment.

Installation procedures of the presently described low-E housewrap include those as described, for example, in the technical manual for ESP Low-E® Housewrap utilized on exterior walls and under a primary barrier. The technical manual for ESP Low-E® Housewrap is submitted herewith and is hereby fully incorporated herein by reference. Turning to FIG. 12, an exemplary exterior wall assembly 40 is constructed and prepared for receiving the low-E housewrap material of the present invention. In the illustrated example, a window opening 42 is shown. In a preferred embodiment, the low-E housewrap is employed after the walls have been construction and all sheathing and flashing details have been installed. The low-E housewrap material is preferably applied before doors and windows have been set inside framed openings and prior to the installation of the primary wall covering.

Figure 13:
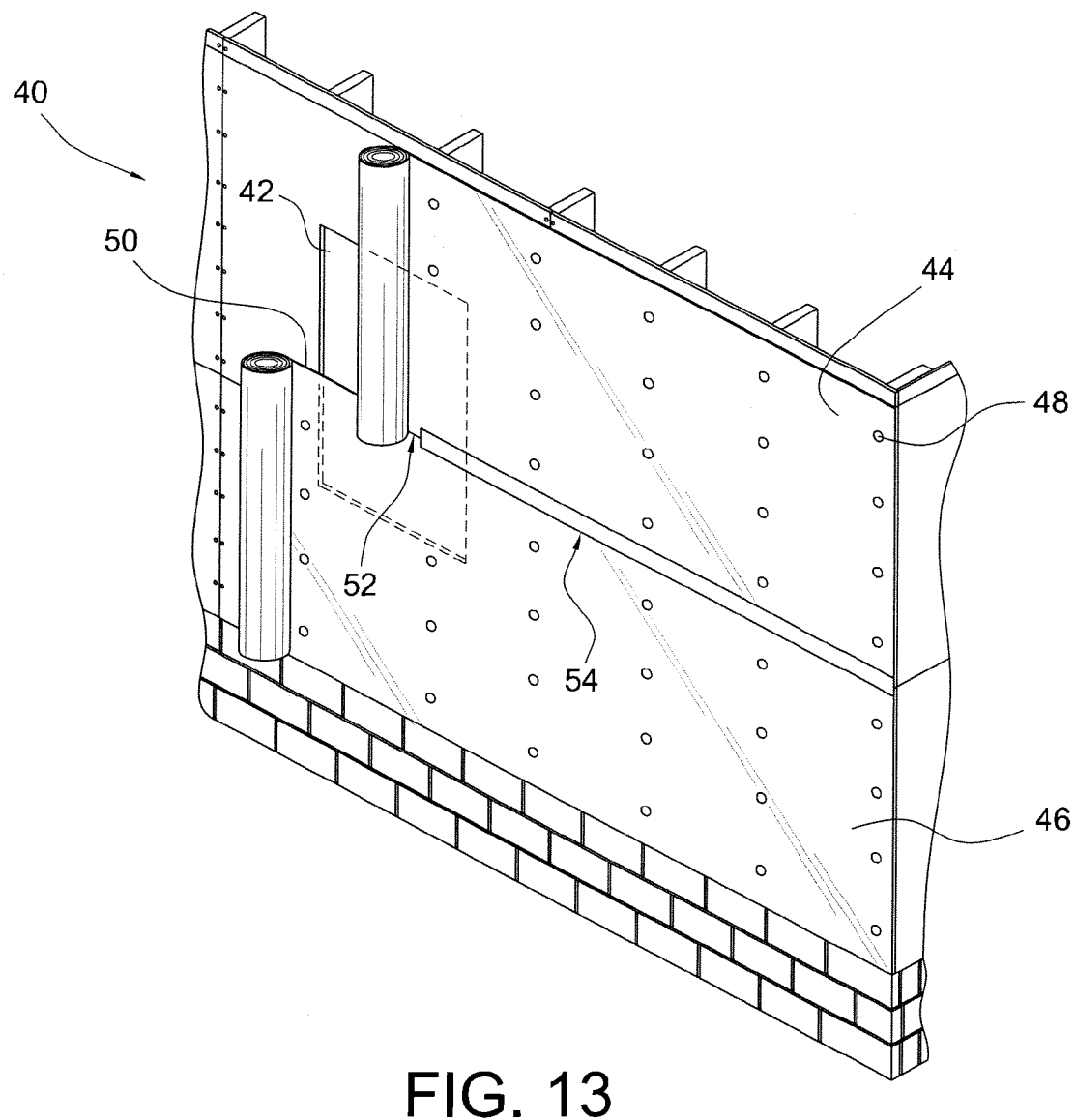
FIG. 13 provides a low-E housewrap material application to the exemplary wall structure of FIG. 12. according to an exemplary disclosed embodiment.

Turning to FIG. 13, a first low-E housewrap material is applied to the wall assembly 40. The reflective side of the low-E housewrap material is installed facing outwardly. In one preferred embodiment, a roll of low-E housewrap material is unrolled horizontally starting at the corner of a preferred exterior wall 40. The flange side or flap portion (e.g., 14, 16 of FIG. 1) of the roll is installed facing downwardly. The low-E housewrap material is secured to the exterior wall with fasteners 48 such as staples or cap nails (or any other suitable fasteners) at preferably every 8-12". When applying another horizontal run of low-E housewrap material 44, the foam ends of each applied section of rolled low-E housewrap material abut together such that the flange 52 of the additionally applied low-E housewrap material 44 is allowed to overlap the outside edge 50 of the adjacent low-E housewrap material 46. This installation ensures that any intruding water is encouraged by the drainage plane (e.g., 24 of FIG. 2) to flow downwardly.

In a preferred embodiment, the flange 52 is installed to overlap the abutting foam edge by approximately 2". The low-E housewrap material is installed to extend over all of the sill plates by a minimum of approximately 1". The vertical and horizontal seam areas are sealed with suitable low-E foil tape. The low-E housewrap material may be trimmed around each framed opening with additional appropriate detailing applied as per window/door manufacturer and/or code standards.

Once installed, an appropriate exterior covering may be applied/installed over the low-E housewrap. Such covering may include, but not limited to, siding, brick, stone, masonry, stucco and concrete veneers. The utilization of the herein described low-E housewrap provides, inter alia, a protective wrap that not only improves energy efficiency in accordance with newly implemented industry-wide energy/code regulations, but enhances drainage of damaging moisture build-up while protecting against air infiltration.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. A flexible insulation comprising:
   a base insulating material;
   a reinforcement material having a first side and a second side;
   a covering material positioned over reinforcement material, wherein the first side of the reinforcement material and the base insulating material are coupled without use of an adhesive and wherein the second side of the reinforcement material and the covering material are coupled without use of an adhesive, wherein the base insulating material provides a system U-value less than 0.063;
   a plurality of perforations, wherein each of the perforations comprises an opening through both the base insulating material and the covering material; and
   a water resistive flap portion extending beyond an edge of the base insulating material, the flap portion being configured to cover an edge of a portion of an abutting second flexible insulation and to provide a water resistive barrier between the abutting flexible insulations, wherein the plurality of perforations provide the flexible insulation with a permeance and water vapor transmission in a range of about 5 to about 20 perm.

2. The flexible insulation of claim 1, wherein the perforations are provided in the flexible insulation at a rate of four holes per 1.25 square inch.

3. The flexible insulation of claim 1, wherein the perforations are provided in rows, and wherein at least one perforation in one row of perforations is offset from another perforation in another row of perforations.

4. The flexible insulation of claim 1, wherein the perforations are generated from a perforation system consisting of $\frac{1}{16}$" punchers.

5. The flexible insulation of claim 1, wherein the perforations are provided in a repeating pattern.

6. The flexible insulation of claim 1, wherein the flexible insulation is a low-E material.

7. The flexible insulation of claim 1, wherein the base insulating material comprises closed cell polyethylene foam.

8. The flexible insulation of claim 1, wherein the base insulating material includes polyolefin.

9. The flexible insulation of claim 1, wherein the base insulating material has a thickness of approximately 0.25".

10. The flexible insulation of claim 1, wherein the base insulating material and the first side of the reinforcement material are flame or heat roller laminated together and wherein the second side of the reinforcement material and the covering material are flame or heat roller laminated together.

11. The flexible insulation of claim 1, wherein the reinforcing material includes a scrim reinforcing material.

12. The flexible insulation of claim 11, wherein the scrim reinforcing material provides the flexible insulation with a tensile strength of approximately 23 pounds per inch width in a machine direction and 25 pounds per inch width in a cross machine direction on a test specimen made of the flexible insulation, wherein the test specimen has a size of approximately 1" wide by 9" long.

13. The flexible insulation of claim 1, wherein the covering material includes aluminum.

14. The flexible insulation of claim 1, wherein the covering material is made of approximately 99.4% polished aluminum.

15. The flexible insulation of claim 1, wherein the reinforcing material and the covering material extend beyond an edge of the base insulating material to form the flap portion.

16. The flexible insulation of claim 15, wherein the flap portion is a self adhered drainage plane.

17. The flexible insulation of claim 1, wherein the flexible insulation further comprises an adhesive material on an external surface of the flexible insulation.

18. The flexible insulation of claim 17, wherein the flexible insulation further comprises a protective film over the covering material with the adhesive material provided therebetween.

19. The flexible insulation of claim 1, wherein the adhesive material is provided in a strip along an edge of the flexible insulation and is provided on a surface of the covering material.

20. The flexible insulation of claim 1, further comprising a second covering material positioned over a back side of the base insulating material.

21. The flexible insulation of claim 1, wherein the flexible insulation achieves a permeance and water vapor transmission of approximately 7 perm or 40 g/day/m$^2$.

22. The flexible insulation of claim 1, wherein the flexible insulation achieves an emittance of 0.10 or less in accordance with test Method C 1371.

23. The flexible insulation of claim 1, wherein the flexible insulation achieves an emittance of between about 0.03 and about 0.05 in accordance with test Method C 1371.

24. The flexible insulation of claim 1, wherein the covering material is reflective.

25. A low-E material comprising:
- a base insulating material, wherein the base insulating material comprises closed cell polyethylene foam or polyolefin and wherein the base insulating material has a thickness of approximately 0.25", wherein the base insulating material provides a system U-value less than 0.063;
- a reinforcement material having a first side and a second side;
- a covering material including aluminum positioned on the reinforcement material, wherein the base insulating material and the first side of the reinforcement material are laminated together and the second side of the reinforcement material and the covering material are laminated together;
- a plurality of perforations, wherein each of the perforations comprises an opening through both the base insulating material and the covering material; and
- a water resistive flap portion extending beyond an edge of the base insulating material, the flap portion being configured to cover an edge of a portion of an abutting second low-E material and to provide a water resistive barrier between the abutting low-E materials,
- wherein the plurality of perforations provide the low-E material with a permeance and water vapor transmission in a range of about 5 to about 20 perm.

* * * * *